United States Patent [19]
Schlegel et al.

[11] 3,918,821
[45] Nov. 11, 1975

[54] ARTICULATED CONNECTOR

[75] Inventors: William L. Schlegel, Stanhope;
Joseph E. Grabarczyk, Gladstone;
Robert J. Krihak, Stanhope, all of
N.J.

[73] Assignee: Komline-Sanderson Engineering Corporation, Peapack, N.J.

[22] Filed: June 14, 1974

[21] Appl. No.: 479,578

[52] U.S. Cl. .................. 403/57; 403/123; 403/292; 210/401
[51] Int. Cl.² ........................................ B01D 33/14
[58] Field of Search ....... 403/57, 78, 165, 123, 286, 403/124, 125, 292; 64/2 P; 24/31 C; 210/401

[56] References Cited
UNITED STATES PATENTS

| | | | |
|---|---|---|---|
| 1,271,014 | 7/1918 | Bower | 24/31 C |
| 1,683,697 | 9/1928 | Rankin | 24/31 C |
| 2,439,195 | 4/1948 | Witmyer et al. | 403/57 X |
| 2,497,804 | 2/1950 | Stearns | 403/292 X |
| 3,701,432 | 10/1972 | Schlegel | 210/401 |

FOREIGN PATENTS OR APPLICATIONS

| | | | |
|---|---|---|---|
| 165,760 | 12/1905 | Germany | 64/2 P |

*Primary Examiner*—Andrew V. Kundrat
*Attorney, Agent, or Firm*—Watson, Cole, Grindle & Watson

[57] ABSTRACT

A pair of coupling bodies interconnected for relative angular and rotational movement, comprise plugs at their relatively remote ends proportioned for reception within the ends of the spring portions to be interconnected. The terminal ends of the spring portions are bent radially into grooves which encircle the bodies, while the projecting external ends of the bodies comprise flanges for separating the terminal ends from each other. In a preferred embodiment, the diameter of the flanges is greater than the internal spring diameter to abut against the terminal ends and accurately locate them with respect to the grooves during assembly.

3 Claims, 2 Drawing Figures

ARTICULATED CONNECTOR

This invention relates to articulated connectors or couplings for interconnecting the ends of coil springs to form endless spring elements. Such elements are commonly used as components of filter media in rotary drum filters, as exemplified for instance in the prior U.S. Pat. Nos. 2,652,927, 2,652,928 and 2,699,260 of Thomas R. Komline.

More specifically, the articulated coupling of the present invention constitutes an improvement over that disclosed in the U.S. Pat. to Schlegel No. 3,701,432 of Oct. 31, 1972. Such patented coupling comprised plugs which were coupled together by a loosely fitting pin extending through bores in the plugs, so as to permit angular and rotary movement between the plugs. The plugs, in turn, were adapted for reception in the interconnected ends of the coil spring or springs and the adjacent terminal ends of the springs were inwardly bent or directed to extend between the said plugs in abutting engagement with the opposed end faces of the plugs, so as to retain the latter within the respective spring ends.

In such prior art construction, however, it has been found that the inwardly bent terminal ends of the springs may interfere with each other to prevent relative rotation of their respective spring ends, as is necessary to relieve torsional stresses.

Moreover, in assembling such couplings to the springs, it has been necessary that the couplings be manually positioned and held in position within the springs while the terminal ends of the springs are bent radially inwardly toward the axis of the coupling. Because of this the plugs are not always accurately located with respect to the terminal spring ends and the bending or crimping tool may occasionally bend the connecting pin which holds the plugs together, thus rendering the coupling useless for its intended purpose of providing a flexible and strain free connection.

Further, it has been found that with the foregoing prior art construction, the inward bending of the relatively adjoining coil spring ends produces a gap in the surface of the filter media, between the axially spaced ends of the interconnected springs and also at the locations where the bending of the terminal ends occurs. Where such gaps are larger than the interstices between adjoining spring coils, through which interstices, the filtering action is intended to occur, the fine solids which would ordinarily be filtered out by the filtering media can find their way through these larger gaps, resulting in an imperfect filtering operation with undesirable solid material levels in the filtrate.

With the foregoing considerations in mind, the primary objects of the present invention are:

To provide an improved coupling of the type described in which the inwardly bent terminal ends of the interconnected springs or spring portions are physically separated, thus to prevent their contact and/or interference with each other; to provide means for substantially reducing the size of the gaps formed at the coupling, so as to increase the efficiency of the filtering operation; and to provide stop means for accurately positioning the coupling relative to the interconnected springs or spring end portions, so as to locate encircling grooves of the coupling bodies in registry with the terminal ends of the respective springs, preparatory to bending or crimping the terminal ends radially into said grooves.

SUMMARY OF THE INVENTION

In thus carrying out the invention, the coupling is so constructed as to comprise a pair of unitary bodies, formed with normally aligned bores extending through them for loose reception of a connecting pin which has enlargements at its opposite ends for retaining the bodies on the pin, the bodies being relatively rotatable and capable of limited relative angular movement on the pin in an axial plane thereof. The bodies, which are coaxial with their respective bores, respectively include plugs at their relatively remote ends, proportioned for reception in the respective coil springs, and flanges at their relative adjacent ends, each body being encircled by a groove between its said plug and its said flange for reception of a radially inwardly directed terminal end of one of the interconnected coil springs. The plugs present annular shoulders, defining side walls of the grooves of their respective bodies for endwise engagement with the radially inwardly directed terminal spring ends to retain the springs axially on the plugs.

The flanges of the coupling when in use are thus interposed between the respective inwardly bent terminal ends of the springs, so as to separate them and avoid any interengagement such as might interfere with relative rotation of the interconnected springs. Further, the flanges are interposed between the bending or assembling tool and the connecting pin between the two bodies, so as to effectively shield the pin from inadvertent damaging contact by the tool such as might bend the connecting pin and thereby render the coupling defective. The flanges are preferably so arranged as to occupy most of the space between the interconnected springs, so that any gaps between the coupling means and springs through which solids might pass, when the springs are used as part of a filter media, are maintained at minimum size.

The relatively adjacent end faces of the flanges in the preferred embodiment are of spherically curved configuration to permit relative angular movement between the bodies despite positioning of these end faces in near proximity to each other. Although the end faces in accordance with one embodiment of the invention may both be convexly curved, it has been found that in a relatively improved embodiment, the said end faces may be substantially concentrically curved in a manner to permit relative angular movement between the bodies while at the same time the gaps through the coupling may be reduced to a size not appreciably exceeding that of the filtering interstices between the adjoining coils of the coil springs.

The specific embodiments of the invention are illustrated by way of exemplification in the accompanying drawings in which.

Figure 1:
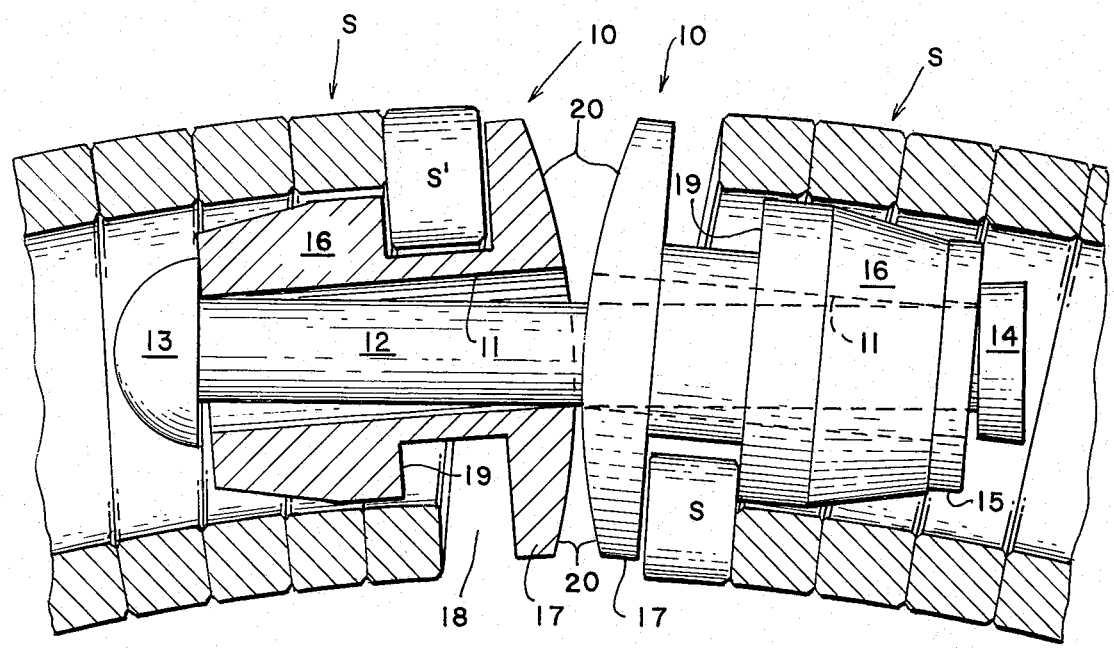
FIG. 1 is a view partly in section and partly in elevation of a coil spring coupling employed to interconnect the ends of a coil spring.

Referring now in detail to the accompanying drawings and considering first the embodiment illustrated in FIG. 1, the adjoining end portions of a coil spring S (shown fragmentarily) are interconnected by an articulated coupling constructed in accordance with the invention.

Since the coupling of the invention is especially adapted for use in interconnecting the ends of coil springs in endless loops for passage around endless circuits, as for instance where the springs are employed as components of the filter media of rotary drum filters and are adapted for passage through an endless circuit defined by the filter drum and its associated rolls, the spring is illustrated in a bent or curved configuration such as it will assume for instance during passage around one of the rolls defining the endless circuit.

A plurality of such springs will normally be employed to conjointly define a coil spring filter media such as disclosed in the prior U.S. Pat. Nos. 2,652,927, 2,652,928 and 2,669,260 of Thomas R. Komline. It will be understood that the coil springs when thus employed are slightly stretched or tensioned to leave fine interstices between adjoining coils of each spring through which a liquid slurry is filtered to remove therefrom any solid particles too large to pass through these interstices.

The articulated coupling of the present invention employed to interconnect the ends of the spring S comprises a pair of unitary coupling bodies 10—10 formed with normally aligned bores 11—11 therethrough, the bodies 10—10 being symmetrically arranged with respect to each other.

A preferably rigid connecting pin 12 extending loosely through the bores 11 has enlargements 13, 14 at its opposite ends for retaining the bodies on the pin. It is to be noted that the coupling bodies are relatively rotatable on the pin and capable of relative limited angular movement thereon in axial planes of the pin, such angular movement being possible by virtue of the substantially large clearance between the bores 11—11 and the connecting pin 12. Preferably the connecting pin 12 comprises a conventional rivet having a hemispherical, preformed head 13, the flat surface of which abuts against the corresponding radial end surface of its associated coupling member 10.

The flared enlargement 14 at the opposite end of the pin is preferably separated from the adjoining end of its adjacent coupling member 10 by a washer 15 which prevents wedging reception of the flared head within the bore of its adjacent coupling member 10, such as might interfere with both the rotary movement and angular movement of the latter on the pin.

The coupling bodies 10—10 are coaxial with their respective bores 11 and respectively include plugs 16 at their relatively remote ends porportioned for free axial reception within the interiors of the respective coil springs S. The bodies further include flanges 17 at their relatively adjacent ends, and each body 10 is encircled by a groove 18 between its plug 16 and flange 17 for reception of a radially inwardly directed terminal end S of its associated spring portion. The plugs 16 respectively present annular shoulders 19 at the side walls of their respective grooves for endwise abutment with the terminal ends S—S to retain the spring portions axially on the plugs.

It will be appreciated that the flanges 17—17 project forwardly toward each other in advance of the spring terminal ends S and thereby separate the latter so as to avoid any possibility of contact between them such as might interfere with relative rotary movement between the spring ends, thereby leaving them free for relative rotary movement, such as may be required to relieve torsional forces on the spring. Also by virtue of occupying a large proportion of the space between the interconnected spring ends, the flanges 10—10 reduce the size of the otherwise existing void or gap through which unfiltered solid particles might otherwise pass, where the spring S is incorporated in a filter media. To this end it has been found that the adjacent end surfaces or faces 20—20 of the flanges may closely approach each other without interferring with the relative angular movement between their respective coupling bodies 10—10, if they are convexly curved as shown in FIG. 1.

Further, for the purpose of causing them to occupy the full diameter of the space or void between the adjoining interconnected spring ends S, it has been found desirable to form the flanges 20 of a diameter greater than that of the plugs 12, and preferably closely approaching though not exceeding the external diameter of their associated spring ends.

It will be seen when the plugs 12 are fully inserted into the coil springs S their flanges 17 will be in endwise abutment with the respective springs. During assembly of the coupling with the springs, the flanges will serve as stops to locate the grooves 18 accurately in registry with the terminal ends S of the interconnected spring portions, thus facilitating the subsequent bending of the spring ends S into the grooves 18 by the use of any suitable tool such as a punch or a plier like implement.

During this operation of bending or crimping the terminal ends S in the grooves, it will be apparent that the flanges 17 will shield the connecting pin 12 from contact with or damage by either the terminal ends or the tool which is used to bend them. In this way accidental bending of the pins and the loss of proper coupling functions are avoided or greatly reduced.

Figure 2:
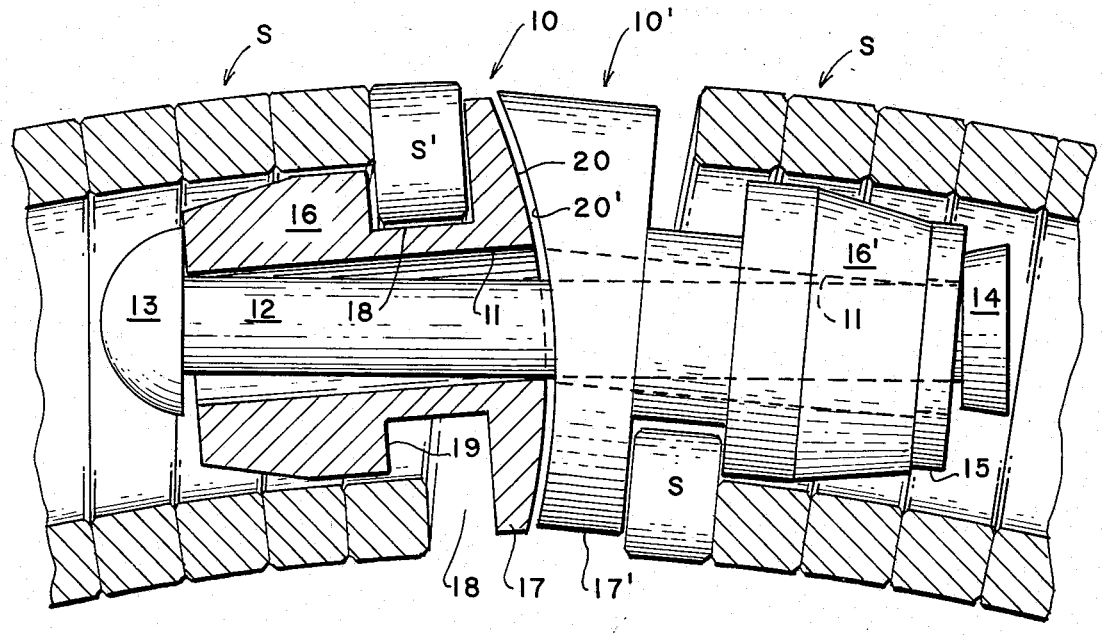
FIG. 2 is a view similar to FIG. 1 in which the coupling structure is slightly modified.

In the embodiment of FIG. 2, the parts and their functions are similar to those of FIG. 1, and similar parts are accordingly designated by similar reference characters. However the FIG. 2 construction differs from FIG. 1 in that the adjoining end faces of the flanges 17, 17, instead of being both convexly curved, are substantially concentrically curved. In other words, only the end face 20 of the flange 17 is convex, while the end face 20 of flange 17 is correspondingly concave. This permits the end faces to be uniformly closely spaced throughout their entire areas, thereby to still more completely occupy the otherwise existing void or gap between the interconnected spring ends than in the embodiment of FIG. 1, while still permitting relative angular movement of the coupling bodies on their connecting pin 12.

We claim:

1. An articulated coupling for coil springs comprising: a pair of unitary coupling bodies formed with normally aligned bores therethrough; a connecting pin extending loosely through said bores and having enlargements at its opposite ends for retaining the bodies on said pin, said bodies being relatively rotatable and capable of limited relative angular movement in an axial plane of said pin; said bodies being coaxial with their respective bores and respectively including plugs at their relatively remote ends having external diameters less than the internal diameters of said coil springs for free axial reception in the respective coil springs, and flanges at the relatively adjacent ends of said bodies, each said body being encircled by an annular groove between its said plug and its said flange of a width substantially equal to the width of a single coil of said spring for reception and axial retention of a radially inwardly directed terminal end of a coil of said spring, said plugs respectively presenting annular shoulders defining side walls of their said grooves for endwise abutment with said terminal coil spring ends to retain said coil springs axially on the plugs; the diameters of said flange being greater than the diameters of the respective plugs for endwise abutment with the respective springs during assembly of the couplings to said springs, whereby to locate said grooves accurately in registry with the said terminal spring ends and said flanges have a maximum combined width and configuration that continuously bridge substantially the entire axial distance between the interconnected terminal ends over the entire range of coupling articulation.

2. The combination of claim 1 wherein said flanges have relative adjacent end faces of convexly curved configuration to permit relative angular movement between said bodies despite near proximity of said adjacent end faces to each other.

3. An articulated coupling as defined in claim 1 in which said end faces are concentrically curved.

* * * * *